US006849702B2

(12) United States Patent
Callahan et al.

(10) Patent No.: US 6,849,702 B2
(45) Date of Patent: Feb. 1, 2005

(54) POLYMER MATRIX MATERIAL

(76) Inventors: Robert W. Callahan, 191 Avalon Gardens Dr., Nanuet, NY (US) 10954; Mark G. Stevens, 91 Main St., Metuchen, NJ (US) 08840; Muguo Chen, 37 Rome Ave., 5A, Bedford Hills, NY (US) 10507

( * ) Notice: Subject to any disclaimer, the term of this patent is extended or adjusted under 35 U.S.C. 154(b) by 50 days.

(21) Appl. No.: 09/942,887

(22) Filed: Aug. 30, 2001

(65) Prior Publication Data

US 2002/0010261 A1 Jan. 24, 2002

Related U.S. Application Data

(63) Continuation-in-part of application No. 09/482,126, filed on Jan. 11, 2000, now Pat. No. 6,358,651, and a continuation-in-part of application No. 09/259,068, filed on Feb. 26, 1999, now Pat. No. 6,605,391.
(60) Provisional application No. 60/301,558, filed on Jun. 28, 2001.

(51) Int. Cl.$^7$ ................................................ C08F 26/08
(52) U.S. Cl. ..................... 526/264; 526/271; 526/287; 526/306; 526/307.2; 526/307.6; 526/317.1; 526/318.2; 429/303
(58) Field of Search ................................ 526/264, 271, 526/287, 306, 307.2, 307.6, 317.1, 318.2; 429/27, 29, 303

(56) References Cited

U.S. PATENT DOCUMENTS

| | | | |
|---|---|---|---|
| 2,933,547 A | 4/1960 | Grubb ........................ 136/100 |
| 2,977,514 A | 3/1961 | Myers et al. ................ 317/230 |
| 3,408,233 A | 10/1968 | Parker et al. ................ 136/153 |
| 3,871,918 A | 3/1975 | Viescou ........................ 136/30 |
| 4,034,144 A | 7/1977 | Chireau ........................ 429/144 |
| 4,110,143 A | 8/1978 | Cogliano et al. ............ 156/167 |
| 4,122,133 A | 10/1978 | Bernstein et al. ............ 260/878 |
| 4,201,641 A | 5/1980 | Gotoda et al. ......... 204/159.17 |
| 4,221,123 A | 9/1980 | Bucci et al. ..................... 73/38 |
| 4,225,657 A | 9/1980 | Klem et al. ................. 429/248 |
| 4,234,623 A | 11/1980 | Moshtev et al. ........... 427/54.1 |
| 4,273,840 A | 6/1981 | Machi et al. ................ 429/144 |
| 4,294,899 A | 10/1981 | Witherspoon ............... 429/206 |
| 4,298,667 A | 11/1981 | Rampel ...................... 429/248 |
| 4,378,414 A | 3/1983 | Furukawa et al. .......... 429/144 |
| 4,434,215 A * | 2/1984 | Wszolek et al. ............ 429/144 |
| 4,471,037 A | 9/1984 | Bannister .................... 429/191 |
| 4,505,797 A * | 3/1985 | Hodgdon et al. ........... 204/252 |
| 4,505,997 A | 3/1985 | Armand et al. ............. 429/192 |
| 4,544,616 A | 10/1985 | Poa et al. .................... 429/229 |
| 4,585,710 A | 4/1986 | McEvoy ........................ 429/27 |
| 4,652,504 A | 3/1987 | Ando ........................... 429/105 |
| 4,654,279 A | 3/1987 | Bauer et al. ................. 429/192 |
| 4,664,761 A | 5/1987 | Zupancic et al. ........... 204/129 |
| 4,681,698 A | 7/1987 | Graham et al. .......... 252/182.1 |
| 4,708,981 A | 11/1987 | Zupancic et al. ............. 525/59 |
| 4,818,643 A | 4/1989 | Cook et al. ................. 429/188 |
| 4,822,701 A | 4/1989 | Ballard et al. .............. 429/192 |
| 4,886,716 A | 12/1989 | Roggero et al. ............. 429/192 |
| 4,925,751 A | 5/1990 | Shackle et al. ............. 429/191 |
| 4,970,012 A | 11/1990 | Kuroda et al. ............. 252/62.2 |
| 4,978,473 A | 12/1990 | Kuroda et al. .............. 252/500 |
| 5,001,023 A | 3/1991 | Cheshire et al. .............. 429/94 |
| 5,009,970 A | 4/1991 | Kronfli et al. .............. 429/192 |
| 5,064,548 A | 11/1991 | Roggero et al. ........... 252/62.2 |
| 5,183,872 A | 2/1993 | Heidel et al. ................ 527/300 |
| 5,226,902 A * | 7/1993 | Bae et al. ................. 604/892.1 |
| 5,238,758 A | 8/1993 | Lee et al. .................... 429/191 |
| 5,264,307 A | 11/1993 | Andrei et al. ............... 429/192 |
| 5,455,127 A | 10/1995 | Olsen et al. ................. 429/192 |
| 5,508,129 A | 4/1996 | Barker ......................... 429/50 |
| 5,510,046 A | 4/1996 | Li et al. ..................... 252/62.2 |
| 5,518,838 A | 5/1996 | Bai et al. .................... 429/191 |
| 5,523,180 A | 6/1996 | Armand et al. ............. 429/188 |
| 5,526,223 A | 6/1996 | Wu et al. .................... 361/508 |
| 5,538,813 A | 7/1996 | Li .............................. 429/192 |
| 5,541,019 A | 7/1996 | Anani et al. ................... 429/59 |
| 5,549,988 A | 8/1996 | Reichert et al. ............ 429/192 |
| 5,552,245 A | 9/1996 | Li et al. ...................... 429/188 |
| 5,585,039 A | 12/1996 | Matsumoto et al. ........ 252/500 |
| 5,609,974 A | 3/1997 | Sun ............................. 429/192 |
| 5,658,685 A | 8/1997 | Oliver ......................... 429/190 |
| 5,665,265 A | 9/1997 | Gies et al. .................. 252/62.2 |
| 5,688,614 A | 11/1997 | Li et al. ...................... 429/192 |
| 5,732,231 A | 3/1998 | Evans ......................... 395/339 |
| 5,807,412 A | 9/1998 | Li et al. ..................... 29/623.5 |
| 5,858,264 A * | 1/1999 | Ichino et al. .............. 252/62.2 |
| 5,897,974 A | 4/1999 | LaFleur ....................... 429/192 |
| 5,985,487 A | 11/1999 | Chaloner-Gill et al. ..... 429/189 |
| 6,019,908 A | 2/2000 | Kono et al. ................ 252/62.2 |
| 6,080,282 A | 6/2000 | Kolb et al. ................ 204/157.6 |
| 6,096,234 A | 8/2000 | Nakanishi et al. ......... 252/62.2 |
| 6,174,626 B1 | 1/2001 | Kojima et al. .............. 429/306 |
| 6,180,287 B1 | 1/2001 | Watanabe et al. ........... 429/312 |
| 6,232,019 B1 | 5/2001 | Wunder et al. ............. 429/300 |
| 6,258,870 B1 * | 7/2001 | Hubbell et al. ............... 522/26 |
| 2001/0030127 A1 * | 10/2001 | Li et al. ..................... 204/252 |
| 2002/0155327 A1 * | 10/2002 | Faris ............................. 429/9 |
| 2003/0022047 A1 * | 1/2003 | Chen et al. ................... 429/29 |

FOREIGN PATENT DOCUMENTS

| | | |
|---|---|---|
| EP | 0 323 006 A2 | 7/1989 |
| EP | 0 474 617 A1 | 3/1992 |
| EP | 0 651 455 A1 | 5/1995 |
| EP | 0651 455 B1 | 7/1997 |
| EP | 0 834 939 A2 | 9/1997 |
| EP | 0 834 942 A1 | 9/1997 |
| EP | 0 848 436 A2 | 10/1997 |
| JP | 07262979 A | 3/1994 |
| JP | 07320712 A | 5/1994 |

(List continued on next page.)

*Primary Examiner*—Helen L. Pezzuto
(74) *Attorney, Agent, or Firm*—Ralph J. Crispino (57) ABSTRACT

The polymer matrix material includes a polymerization product of one or more monomers selected from the group of water-soluble, ethylenically-unsaturated acids and acid derivatives, and a crosslinking agent. A quantity of water is used for polymerization, such that the polymer material is swelled to a defined volume upon curing. Optionally, a water-soluble or water-swellable polymer and/or a chemical polymerization initiator.

70 Claims, 3 Drawing Sheets

FOREIGN PATENT DOCUMENTS

| | | |
|---|---|---|
| JP | 08064193 A | 8/1994 |
| JP | 08077997 A | 9/1994 |
| JP | 08185847 A | 12/1994 |
| JP | 08185848 A | 12/1994 |
| JP | 08241704 A | 3/1995 |
| JP | 08315800 A | 5/1995 |
| JP | 07153489 | 6/1995 |
| JP | 09231957 A | 2/1996 |
| JP | 10125300 A | 10/1996 |
| JP | 09330694 A | 3/1997 |
| JP | 10247485 A | 3/1997 |
| JP | 10144282 A | 7/1997 |
| WO | WO 97/34186 | 9/1997 |
| WO | WO 97/41607 | 11/1997 |
| WO | WO 99/18621 | 4/1999 |
| WO | WO 99/25038 | 5/1999 |

* cited by examiner

POLYMER MATRIX MATERIAL

RELATED CASES

This application claims priority to U.S. Provisional Application Ser. No. 60/301,558, filed Jun. 28, 2001 entitled POLYMER MATRIX; and is a Continuation-in-Part application of application Ser. No. 09/259,068, filed Feb. 26, 1999 entitled SOLID GEL MEMBRANE now U.S Pat. No. 6,605,391, and a Continuation-in-Part application of application Ser. No. 09/482,126, filed Jan. 11, 2000 entitled SOLID GEL MEMBRANE SEPARATOR IN RECHARGEABLE ELECTROCHEMICAL CELLS, now U.S. Pat. No. 6,358,651 which are both incorporated by reference herein.

FIELD OF THE INVENTION

This invention relates generally to a polymer matrix material, and more particularly to a polymer matrix material suitable for supporting a liquid solution.

BACKGROUND OF THE INVENTION

Electrochemical devices generally incorporate an electrolyte source to provide the anions or cations necessary to produce an electrochemical reaction. These electrochemical devices include batteries, fuel cells, sensors, electrochemical gas separation systems, electrochromic devices and protein separation devices.

Batteries and fuel cells operate on electrochemical reaction of metal/air, metal/halide, metal/hydride, hydrogen/air, or other materials capable of electrochemical reaction. A zinc/air system, for example, requires the diffusion of hydroxide anions, and typically will incorporate an aqueous potassium hydroxide solution as the electrolyte. The lifetime of this battery is however, limited for several reasons. First, the naked zinc anode is corroded by both the aqueous electrolyte and air. Second, the air channels of the air cathode gradually become blocked by water from the electrolyte solution and third, the electrolyte solution becomes contaminated with zinc oxidation product that diffuses from the anode.

Various methods have been attempted to address the many problems associated with the use of aqueous electrolytes in zinc anode based systems such as zinc/air fuel cells. Additives, for example, have been introduced into the electrolyte solution to extend its lifetime and to protect the anode from corrosion. U.S. Pat. No. 4,118,551 discloses the use of inorganic additives such as mercury, indium, tin, lead, lead compounds, cadmium or thallium oxide to reduce corrosion of a zinc electrode. Many of these additives however, are expensive and more significantly, are very toxic. U.S. Pat. No. 4,378,414 discloses the use of a multi-layer separator between the positive and negative electrodes to reduce corrosion of the anode and contamination of the electrolyte by zinc oxidation products. In addition, hydrophobic materials have been introduced into zinc/air devices to prevent water permeation into the air channels of the cathode. Introduction of hydrophobic materials is however, a difficult process and may result in decreased performance of the cathode.

In addition to zinc/air systems, other metal/air systems, such as aluminum/air, lithium/air, cadmium/air, magnesium/air, and iron/air systems, also have the potential for many different applications due to their theoretically high ampere-hour capacity, voltage, and specific energy. In actual practice however, these very promising theoretical values are greatly reduced due to the corrosion of the metal anode in the electrolyte.

A solid-state hydroxide conductive electrolyte polybenzimidazole ("PBI") film is disclosed in U.S. Pat. No. 5,688,613 and comprises a polymeric support structure having an electrolyte active species dispersed therein, wherein the polymer structure is in intimate contact with both the anode and the cathode. This PBI film, however, does not absorb water and therefore, does not hold water within the membrane, causing it to dry out quickly.

U.S. Pat. No. 3,871,918 discloses an electrochemical cell embodying an electrode of zinc powder granules suspended in a gel comprised of methylenebisacrylamide, acrylic acid and acrylamide. Potassium hydroxide serves as the electrolyte, and is contained within the gel.

With regard to devices that rely on the conduction of cations, while there has been a significant amount of research in this area, most proton conducting membranes are very expensive to produce and typically do not function at room temperature. In the 1970's for example, a fully fluorinated polymer membrane, NAFION® (DuPont, Wilmington, Del. U.S.A.) was introduced and has served as the basis from which subsequent proton conducting membranes have evolved.

U.S. Pat. No. 5,468,574 discloses a proton conductive membrane that is characterized as a highly sulfonated polymeric membrane composed of block copolymers of sulfonated polystyrene, ethylene and butylene blocks. In 1997, NASA's Jet Propulsion Laboratory disclosed the development of an improved proton conductive membrane composed of sulfonated poly(ether ether ketone), commonly known as H-SPEEK.

The separator in a cell or battery physically separates and electrically insulates electrodes of different polarity. While serving as a barrier to the transport of active materials of the different electrodes, a separator should provide ionic conduction. Good ionic conductivity is necessary to ensure that an electrochemical cell/battery is capable of delivering usable amounts of power for a given application.

In a rechargeable electrochemical cell, a separator is also used to prevent short-circuiting, caused by metal dendrite penetration during recharging. For example, in rechargeable zinc/air cells, zinc on the surface of the negative zinc electrode (anode) is dissolved as zincate ion into the electrolyte solution during discharge. Then, during the charge, when the charging current is typically below 20 mA/cm2, depending on the particular anode used, the zincate ion forms dendritic zinc, which is needle-like and grows from the negative electrode toward the charging electrode. Unfortunately, these needle-like structures can pierce through conventional separators causing an internal short circuit. The service life of the cell is consequently terminated. In addition to preventing dendrite penetration, the separator must allow for the exchange of electrolytic ions during both discharging and charging of the cell.

The most commonly used separators in rechargeable cells are porous insulator films of polyolefins, polyvinyl alcohol (PVA), nylon, or cellophane. Acrylic compounds may also be radiation-grafted onto these separators to make them more wettable and permeable to the electrolyte. Although much work has been done to improve the performance of separators, dendrite penetration problems are frequently encountered with these and other conventional separators, as well as problems involving diffusion of reaction products such as the metal oxide to remaining parts of the cell.

With conventional separators, controlling the pore size of the separator is the only effective way to avoid dendrite penetration and prevent product diffusion. By doing this, however, the ionic conductivity of the separator is also greatly reduced. This creates a bottleneck for high charging-discharging current density operations, important considerations for use in some applications, such as in electrical vehicles.

U.S. Pat. No. 5,549,988 (the '988 patent) discloses an electrolyte system separator disposed between the cathode and anode of a rechargeable electrochemical battery. The electrolyte system includes a polymer matrix prepared from polyacrylic acid or derivatives thereof. An electrolyte species, such as KOH or $H_2SO_4$, is then added to the polymer matrix to complete the system. However, as reported in the '988 patent, the measured ionic conductivities of the disclosed electrolyte-polymer films are low, ranging from 0.012 S/cm to 0.066 S/cm. Although these conductivities are acceptable for some applications, they are inadequate for other high rate operations including electrical vehicles.

An electrochemical reaction is also involved in the function of electrochromic devices (ECD's). Electrochromism is broadly defined as a reversible optical absorption change induced in a material by an electrochemical redox process. Typically, an electrochromic device contains two different electrochromic materials (ECM's) having complementary properties; the first is generally reduced, undergoing a color (1)-to-color (2) transition during reduction, while the second material is oxidized, undergoing a similar transition upon the loss of electrons.

Basically, there are two types of electrochromic devices, depending upon the location of the electrochromic materials within the device. In a thin-film type device, the two ECM's are coated onto the two electrodes and remain there during the redox coloration process. In a solution-phase device, both ECM's are dissolved in an electrolyte solution and remain their during the coloration cycle. The solution-phase device is typically more reliable and has a longer lifetime, however, in order to maintain the colored state, an external power source must be continuously applied. As the thin-film type device does not need an external power source to maintain its colored state, power consumption is greatly reduced, making this an advantage for such energy-saving applications as smart windows. The drawback of the thin-film type device is that it has a short lifetime. After a certain number of cycles, ECM films can lose contact with the electrode, or they may no longer be capable of phase change and the device expires.

With regard to solution-phase devices, U.S. Pat. No. 5,128,799, for example, discloses a method of reducing the current required to maintain the colored state that involves the addition of gel into the device. While reducing energy consumption however, the addition of the gel into the device also greatly reduces the switching speed of the device. With regard to thin-film devices, attempts to extend the lifetime of the device have included changes to the crystal structure of the film. While such changes have increased the lifetime of thin-film devices to an extent, the typical lifetime of such devices is still not satisfactory.

The foregoing problems thus present major obstacles to the successful development and commercialization of fuel cell technology, a green energy source, and of electrochromic devices such as smart windows and flat panel displays, which have several energy-saving, decorative, and information display applications. With respect to the problems associated with rechargeable electrochemical cells, it is clear that there is a great need for a separator that can provide improved ionic conductivity while providing an effective barrier against the penetration of metal dendrites and the diffusion of reaction products.

SUMMARY OF THE INVENTION

The present invention provides a polymer matrix material suitable for supporting a liquid solution. The solution may contain any desired liquid solution, for example, for the appropriate application of the material. For example, in systems that operate on basic or acidic electrolytes, appropriate liquid solutions of ionic species may be provided within the polymer matrix material that are highly conductive to anions or cations. In systems that require neutral species, such neutral solutions may be provided within the polymer matrix material.

The polymer matrix material includes a polymerization product of one or more monomers selected from the group of water-soluble, ethylenically-unsaturated acids and acid derivatives, and a crosslinking agent. A quantity of water is used for polymerization, such that the polymer material is swelled to a defined volume upon curing. Optionally, a water-soluble or water-swellable polymer and/or a chemical polymerization initiator.

In accordance with one embodiment, the polymer matrix material may be formed into a polymer matrix membrane incorporating ionic species in solution for use in electrochemical devices. For example, primary batteries, secondary batteries, and fuel cells such as metal/air (e.g. zinc/air, cadmium/air, lithium/air, magnesium/air, iron/air, and aluminum/air), Zn/Ni, Zn/MnO2, Zn/AgO, Fe/Ni, lead-acid, Ni/Cd, and hydrogen fuel cells, may incorporate the polymer matrix membrane with a suitable solution therein. Further, electrochromic devices, such as smart windows and flat panel displays, may employ the polymer matrix membrane with a suitable solution therein. In secondary batteries (i.e., rechargeable), polymer matrix membranes are particularly useful as both an electrolyte source and as a dendrite resistant separator between the charging electrode and the anode. Additionally, other electrochemical cell based devices, such as electrochemical cell gas separators and sensors may amply the polymer matrix membrane herein.

With respect to a zinc/air fuel cell battery, for example, conductive membranes of the present invention may be used to protect the anode, as well as the cathode. In such a system, the ionic species is contained as a solution phase within the polymer matrix membrane, allowing it to behave as a liquid electrolyte without the disadvantages. The polymer matrix membrane protects the anode from corrosion (by the electrolyte as well as by air) and prevents zinc oxidation product from the anode from contaminating the electrolyte. With regard to the cathode, as the membrane is itself a solid, there is no water to block the air channels of the cathode. As a result, the system will have an extended lifetime.

As used herein, the term "anode" refers to and is interchangeable with the term "negative electrode". Likewise, "cathode" refers to and is interchangeable with the term "positive electrode".

The polymer matrix material comprises a polymerization product of a first type of one or more monomers selected from the group of water-soluble, ethylenically-unsaturated acids and acid derivatives. The polymer matrix material also includes a second type monomer, generally as a crosslinking agent. Further, the polymer matrix material may include a water-soluble or water-swellable polymer, which acts as a reinforcing element. In addition, a chemical polymerization initiator may optionally be included. The ionic species may be added to the polymer matrix material after polymerization, and remains embedded in the polymer matrix.

During polymerization, the solution of monomer(s) and the optional water-soluble or water-swellable polymer may include water, a solution of the species ultimately desired within the polymer matrix material, or a combination thereof. The resultant polymer matrix material, therefore, may contain a useful solution therein, such that the polymer matrix material is ready for use in a particular application. In the case where pure water is the only species added to the monomer solution, it acts as a space holder to increase the volume of the cured polymer. By defining the polymer matrix volume with a specific amount of water, the water can be replaced with a solution of the proper concentration of the desired ionic species (the "solution-replacement treatment") without swelling or shrinking of the material (or membrane, depending on the produced form of the material). This is desirable because the strength and ionic conductivity are critically linked to the volume and tortuosity of the solution ionic phase. Significant swelling of a polymer can reduce the mechanical strength of the final material. If, however, the material does not swell enough to provide sufficient electrolyte volume, conductivity is reduced. The solution-replacement treatment may be in the form of dipping, soaking, spraying, contacting (in the presence of a liquid) with ion-exchange resins, or other techniques known to those skilled in the art.

In alkaline systems, for example, the hydroxide ionic species may come from an aqueous alkaline solution of potassium hydroxide, sodium hydroxide, lithium hydroxide, or combinations thereof. Preferably, in a potassium hydroxide solution, for example, the base has a concentration ranging from about 0.1 wt. % to about 55 wt. %, and most preferably about 30 wt. % to about 45 wt. %. In acidic systems, the proton may come from an aqueous acidic electrolyte solution, such as a solution of perchloric acid, sulfuric acid, hydrochloric acid, or combinations thereof. The concentration of perchloric acid, for example, preferably ranges from about 0.5 wt. % to about 70 wt. %, and most preferably about 10 wt. % to about 15 wt. %. The polymer matrix membrane may also be used in neutral systems, wherein the solution supported by the polymer matrix membrane comes from a solution including, but not limited to, a saturated aqueous neutral solution of ammonium chloride and potassium sulfate; a saturated solution of ammonium chloride, potassium sulfate, and sodium chloride; and a saturated neutral solution of potassium sulfate and ammonium chloride.

The principles of the present invention may also be applied to electrochromic devices. Here, the electrochromic materials of the device are contained within polymer matrix membrane, thus providing the device with the reliability and long lifetime associated with solution phase EC systems, and also the energy-saving memory properties associated with thin-film EC systems.

Accordingly, yet another embodiment of the present invention is an electrochromic device wherein electrochromic materials are contained within a polymer matrix membrane. Typically, such a device will involve two electrode substrates and electrochromic materials contained within polymer matrix membranes sandwiched therebetween. The device may optionally include an aqueous or a solid electrolyte disposed between the polymer matrix membranes. The electrode substrates may be comprised of such materials as, for example, platinum, gold, conductive glass, such as indium-tin oxide glass, and the like.

BRIEF DESCRIPTION OF THE DRAWINGS

Numerous other advantages and features of the present invention will become readily apparent from the following detailed description of preferred embodiments when read in conjunction with the accompanying drawings, wherein.

DETAILED DESCRIPTION OF THE ILLUSTRATIVE EMBODIMENTS

Figure 1:
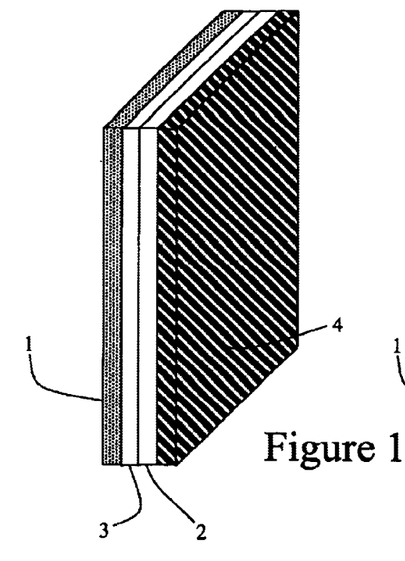
FIG. 1 is a schematic depiction of a zinc/air fuel cell incorporating an anode protective polymer matrix membrane and a hydroxide conducting polymer matrix membrane of the present invention.
Figure 2:
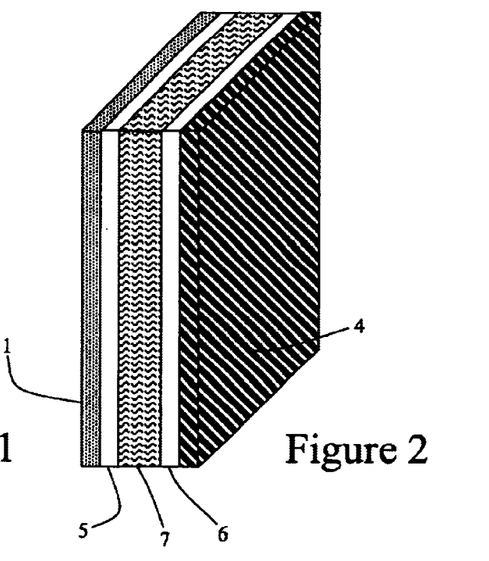
FIG. 2 is a schematic depiction of another embodiment of a zinc/air fuel cell incorporating both an anode and a cathode protective polymer matrix membrane of the present invention.

Referring now to the drawings, FIG. 1 depicts a typical zinc/air fuel cell, wherein two polymer matrix membranes 1, 2 are disposed between a zinc anode 3 and an air cathode 4. The first membrane is an anode protective membrane 1 and the second membrane is a hydroxide conductive membrane 2. The membranes are not only the source of ionic species, and are highly conductive to that species, but they also provide a protective layer to the electrodes to prevent the usual sources of cell destruction. The membranes prevent diffusion of zinc oxidation product into the electrolyte solution phase, they prevent corrosion of the zinc anode by either the electrolyte solution or air, and they prevent blockage of the cathode air channels by water from the electrolyte solution. The zinc/air system of FIG. 2 includes a protective and ionically conductive polymer matrix membrane 5, 6 on the surface of a zinc anode 3 and an air cathode 4, and an aqueous electrolyte 7 between the two.

Figure 3:
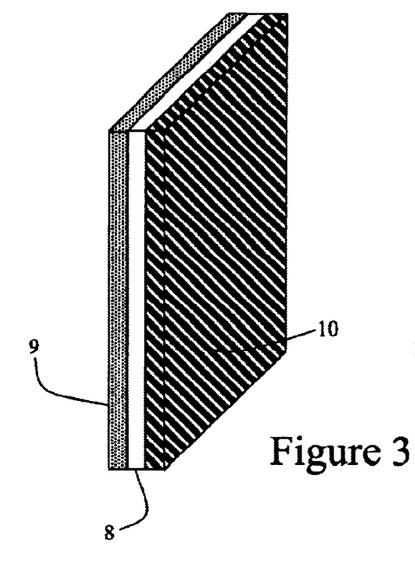
FIG. 3 is a schematic depiction of an aluminum/air fuel cell incorporating a hydroxide conductive polymer matrix membrane of the present invention.

Referring now to FIG. 3, an aluminum/air fuel cell system incorporating a polymer matrix hydroxide conductive membrane 8 between an aluminum anode 9 and the a cathode 10 is depicted. As in the zinc/air system, the polymer matrix membrane of this embodiment serves to prevent the corrosion problems associated with the use of pure liquid electrolyte and also serves as the ionic conducting media.

Figure 4:
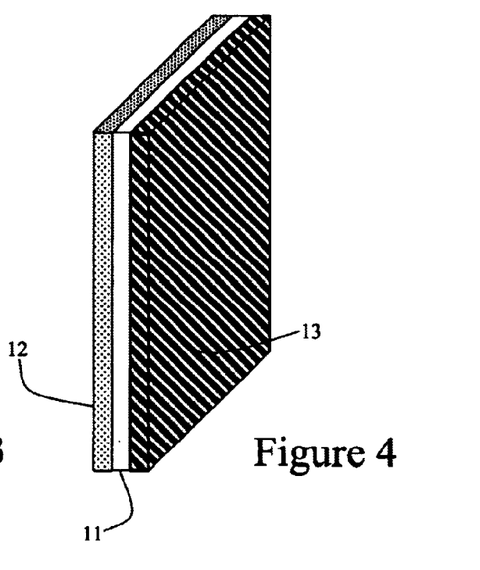
FIG. 4 is a schematic depiction of a hydrogen/air fuel cell incorporating a proton or hydroxide conductive polymer matrix membrane of the present invention.

As illustrated in FIG. 4, when applied to the art of hydrogen fuel cells, the polymer matrix membrane may be used to provide a proton or hydroxide conductive membrane that is easy to produce, much less expensive than existing proton conductive membranes and that functions well at room temperature. Because the actual conducting media remains in aqueous solution within the polymer matrix membrane, the conductivity of the membrane is comparable to that of liquid electrolytes, which at room temperature is significantly high. In this embodiment of the invention, a proton or hydroxide conductive polymer matrix membrane 11 is sandwiched between a hydrogen anode 12 and an air cathode 13, thereby separating the hydrogen and the air.

Figure 5:
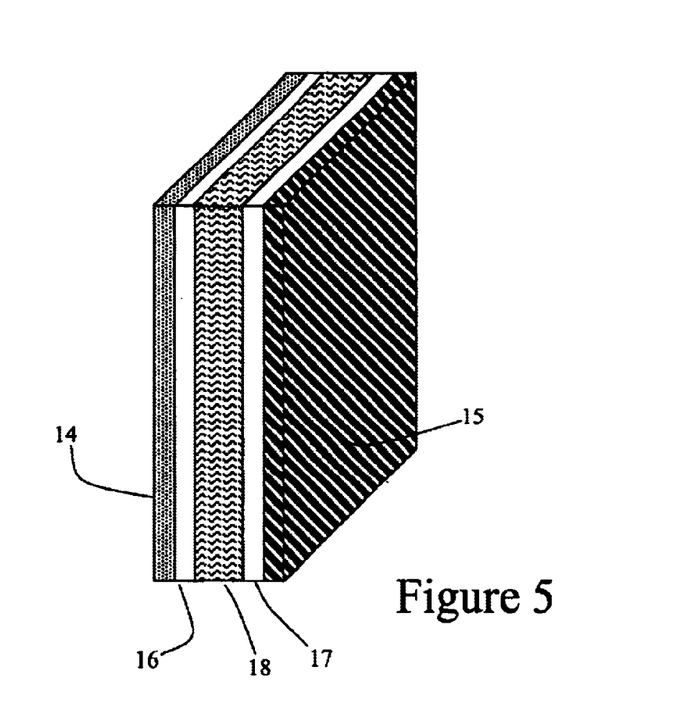
FIG. 5 is a schematic depiction of an electrochromic device wherein the electrochromic materials are contained within polymer matrix membranes of the present invention.

As shown in FIG. 5, the principles of the present invention may also be applied to electrochromic systems. Here, the electrochromic materials (ECM's) are dispersed within a solution phase maintained in the polymer matrix. Since the ECM's are in solution, the device exhibits the superior reliability and long life of a solution phase device and in addition, because the ECM's are physically confined, they can not diffuse into the device's bulk electrolyte and the device therefore also exhibits the superior memory of a thin-film type device. As shown, the device includes two electrode substrates 14, 15 having polymer matrix membrane encapsulated electrochromic materials 16, 17 therebetween. As illustrated, the device optionally includes an aqueous or solid electrolyte 18 disposed between polymer matrix membranes 16, 17.

Figure 6:
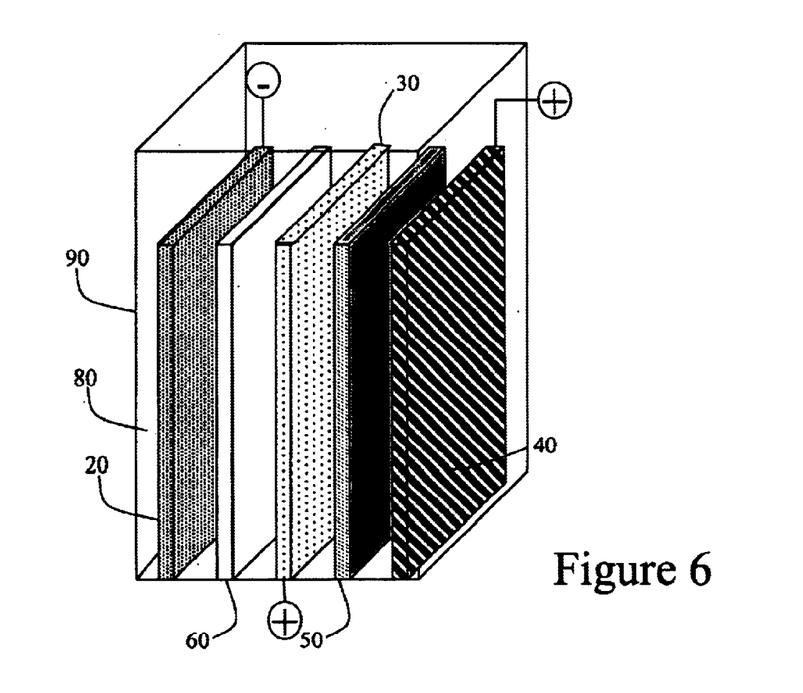
FIG. 6 is a schematic depiction of a rechargeable metal/air battery having three electrodes, a porous spacer, and a polymer matrix membrane incorporated as a separator in accordance with the present invention.

Referring to FIG. 6, there is illustrated therein a rechargeable electrochemical cell fabricated from three electrode assemblies, 20, 30, 40 and contained within housing 90. Electrode 20 represents the negative electrode or metal anode; electrode 40 is the positive electrode, i.e. air cathode; and electrode 30 is a porous charging electrode. In this embodiment, cathode 40 and charging electrode 30 are separate electrodes, and charging electrode 30 is positioned between cathode 40 and a polymer matrix membrane 60. As shown in the drawing, the three electrodes 20, 30, 40 are disposed in spaced apart, parallel relationships with one another. Rechargeable electrochemical cell 100 optionally includes liquid (aqueous) electrolyte 80 in contact with each electrode, polymer matrix membrane 60, and porous spacer 50 (when employed) typically by immersion.

Metal anode 20 is made of an oxidizable metal, preferably zinc, cadmium, lithium, magnesium, iron, or aluminum. For high current density applications, air cathode 40 preferably has a current density of at least 200 mA/cm2. An exemplary air cathode is disclosed in copending, commonly assigned U.S. patent application Ser. No. 09/415,449 entitled ELECTROCHEMICAL ELECTRODE FOR FUEL CELL, filed on Oct. 8, 1999, which is incorporated herein by reference in its entirety. Other air cathodes may instead be used, however, depending on the performance capabilities thereof, as will be obvious to those of skill.

As shown in FIG. 6, porous charging electrode 30 is positioned in parallel relationship between metal anode 20 and air cathode 40. Any inert conductive porous material may be used to form porous charging electrode 30. Examples include, but are not limited to platinum, nickel, nickel oxide, perovskite and its derivatives, carbon, and palladium. In addition, apertures or holes may be drilled or otherwise formed on the charging electrode 30 to aid with the passage of ions. It is important that the electrodes do not physically contact each other, and a distance therebetween sufficient to form a gap for the electrolyte must be provided.

In addition, it is sometimes desirable to position porous spacer 50 between charging electrode 30 and air cathode 40 to ensure sufficient distance between the two electrodes. When porous spacer 50 is included in rechargeable electrochemical cell 100, a gap is formed for the electrolyte on each side of porous spacer 50 and each electrode 30 and 40. However, the invention is not limited to structures which include porous spacer 50. Any means of preventing physical contact between the two electrodes may be employed, such as anchoring the electrodes apart in the housing. However, when porous spacer 50 is used, it is typically made of a porous plastic material, such as nylon, and typically has a thickness ranging from about 0.1 mm to about 2 mm.

As depicted, polymer matrix membrane 60 is disposed in spaced apart, parallel relationship with electrodes 20, 30, 40 and is positioned between charging electrode 30 and metal anode 20. A gap for the electrolyte is provided on each side of polymer matrix membrane 60. Alternatively, but not illustrated, when the polymer matrix membrane is radiation-grafted onto one of the three electrodes, the electrode provides a support for the polymer matrix membrane, and thus no gap exists between the polymer matrix membrane and the electrode on which it is formed. In accordance with the present invention, polymer matrix membrane 60 functions, in part, to prevent shorting between air cathode 40 and metal anode 20.

Figure 7:
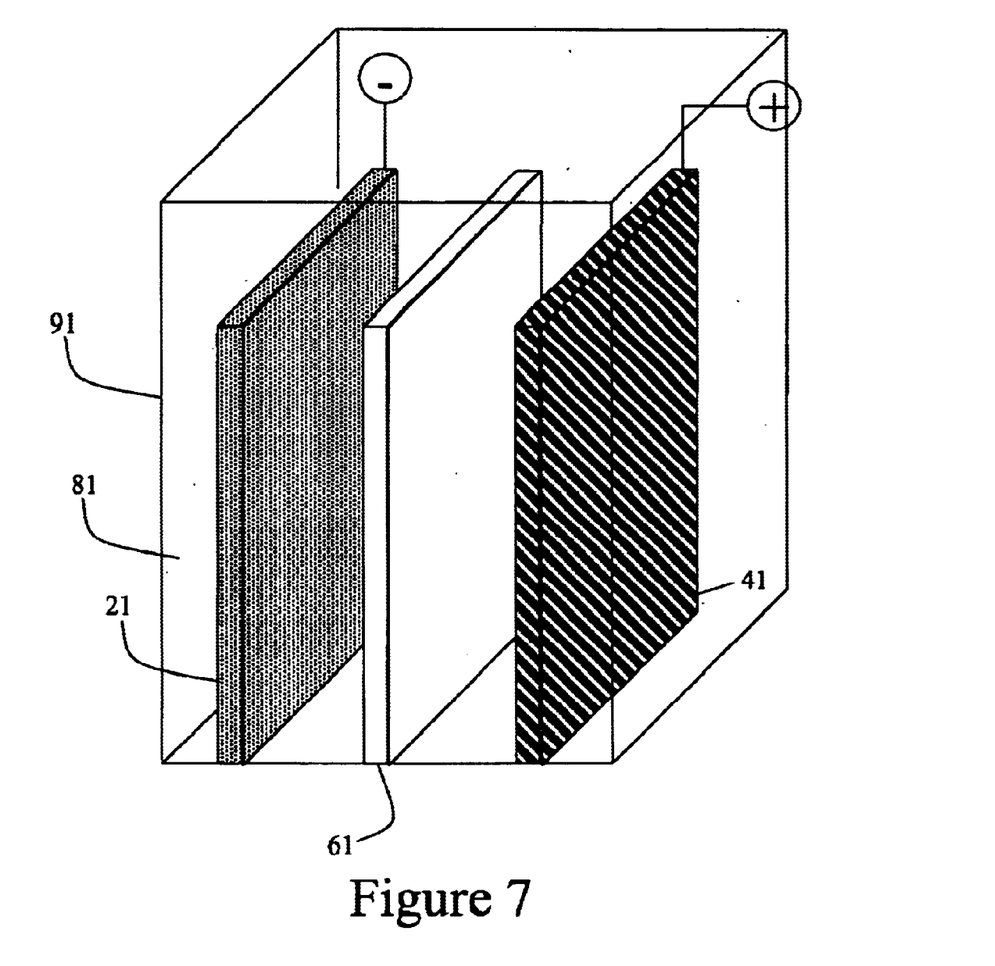
FIG. 7 is a schematic depiction of a rechargeable metal/air battery having an anode, a bifunctional electrode, and a polymer matrix membrane incorporated as a separator in accordance with the present invention.

FIG. 7 shows rechargeable electrochemical cell of the present invention wherein the cathode and charging electrode form single bifunctional electrode 41, i.e. the electrode is used both as the positive electrode and for charging the battery. Optionally, liquid (aqueous) electrolyte 81 may also be included within the housing of the cell. Polymer matrix membrane 61 is disposed between anode 21 and bifunctional electrode 41. The electrochemical cell also includes housing 91.

This dual electrode/separator configuration depicted in FIG. 7 may be used for several different types of rechargeable battery systems. For example, anode 21 may be an oxidizable metal, such as one of those previously listed in connection with FIG. 6 (preferably zinc), and bifunctional electrode 41 may be the previously described air cathode. In another embodiment, anode 21 is zinc or zinc oxide, and bifunctional electrode 41 is nickel oxide, manganese dioxide, silver oxide, or cobalt oxide. Alternatively, anode 21 may be iron or cadmium, and single bifunctional electrode 41 is nickel oxide. In these systems, the ionic species contained in polymer matrix membrane 61 preferably comes from an aqueous alkaline hydroxide solution and associated hydroxide concentration. However, in the rechargeable metal/air cells of the present invention, a neutral polymer matrix membrane 61 can alternately be employed wherein the ionic species comes from a neutral aqueous solutions.

An acidic membrane may be used as polymer matrix membrane 61 in acidic systems such as in rechargeable lead-acid batteries wherein anode 21 is lead and bifunctional electrode 41 is lead oxide. In this embodiment, the ionic species contained in polymer matrix membrane 61 comes from an aqueous solution of perchloric acid, sulfuric acid, hydrochloric acid, phosphoric acid, or combinations thereof.

In other rechargeable electrochemical cell configurations, not depicted, but mentioned above, the polymer matrix membrane may be grafted directly onto the anode, charging electrode, cathode, or bifunctional electrode, when one is used. In this case, support for the polymer matrix membrane is provided by the electrode substrate on which the polymer matrix membrane is formed.

The shape of the electrolyte-solution volume or housing, which is shown as reference number 90 in FIG. 6 and 91 in FIG. 7, is not constrained to be square or rectangular. It can be circular, elliptical, polygonal, or any desired shape. In addition, the cell housing may be fabricated from any strong chemically inert insulation material, such as plastic conventionally used in electrochemical cells and alkaline batteries.

When in operation, conducting wires (not shown), usually copper strips, are adhered to exposed portions of the metal anode, charging electrode, and cathode and/or bifunctional electrode. These conducting wires are used to apply an external voltage to the cell to recharge the anode. An insulating epoxy is typically used to cover the exposed joints.

The polymer matrix material comprises a polymerization product of a first type of one or more monomers selected from the group of water-soluble, ethylenically-unsaturated acids and acid derivatives. The polymer matrix material also includes a second type monomer, generally as a crosslinking agent. Further, the polymer matrix material may include a water-soluble or water-swellable polymer, which acts as a reinforcing element. In addition, a chemical polymerization initiator may optionally be included. The ionic species is added to the polymer matrix material after polymerization, and remains embedded in the polymer matrix material.

The water soluble ethylenically unsaturated acids and acid derivatives may generally have the following formula:

(1)

R1, R2, and R3 may be independently selected from, but are not limited to, the group consisting of H, C, C2-C6 alkanes, C2-C6 alkenes, C2-C6 alkynes, aromatics, halogens, carboxylic acid derivatives, sulfates and nitrates;

R4 may be selected from, but is not limited to, the group consisting of NR5, NHR5, NH2, OH, H, halides including but not limited to Cl and Br, OR5, and carboxylic acid derivatives, wherein R5 may be selected from the group consisting of H, C, C2-C6 alkanes, C2-C6 alkenes, C2-C6 alkynes, and aromatics.

Such ethylenically unsaturated acids and derivatives having the general formula (1), include, but are not limited to, methylenebisacrylamide, acrylamide, methacrylic acid, acrylic acid, fumaramide, fumaric acid, N-isopropylacrylamide, N,N-dimethylacrylamide, 3,3-dimethylacrylic acid, maleic anhydride, and combinations comprising at least one of the foregoing ethylenically unsaturated acids and derivatives.

Other ethylenically unsaturated acids and derivatives monomers having readily polymerizable groups may be used as the first type of monomer, depending on the desired properties. Such monomers include, but are not limited to, 1-vinyl-2-pyrrolidinone, the sodium salt of vinylsulfonic acid, and combinations comprising at least one of the foregoing ethylenically unsaturated acids and derivatives.

Generally, the first type of monomer comprises about 5% to about 50%, preferably about 7% to about 25%, and more preferably about 10% to about 20% by weight, of the total monomer solution (prior to polymerization).

Further, a second type of monomer or group of monomers is provided, generally as a crosslinking agent during the polymerization. Such a monomer is generally of the formula:

(2)

wherein i = 1 → n, and n ≥ 2;

R2,i, R3,i, and R4,i may be independently selected from, but are not limited to, the group consisting of H, C, C2-C6 alkanes, C2-C6 alkenes, C2-C6 alkynes, aromatics, halogens, carboxylic acid derivatives, sulfates and nitrates;

R1 may be selected from, but is not limited to, the group consisting of N, NR5, NH, O, and carboxylic-acid derivatives, wherein R5 may be selected from the group consisting of H, C, C2-C6 alkanes, C2-C6 alkenes, C2-C6 alkynes, and aromatics.

Suitable monomers for use generally as crosslinking agents of the above general formula (2) include methylenebisacrylamide, ethylenebisacrylamide, any water-soluble N,N'-alkylidene-bis(ethylenically unsaturated amide), and 1,3,5-Triacryloylhexahydro-1,3,5-triazine. Such crosslinking monomers generally comprise about 0.01% to about 15%, preferably about 0.5% to about 5%, and more preferably about 1% to about 3% by weight, of the total monomer solution (prior to polymerization).

The water soluble or water swellable polymer, which acts as a reinforcing element, may comprise polysulfone (anionic), poly(sodium-4-styrenesulfonate), carboxymethyl cellulose, polysulfone (anionic), sodium salt of poly (styrenesulfonic acid-co-maleic acid), corn starch, any other water-soluble or water-swellable polymers, or combinations comprising at least one of the foregoing polymers. The addition of the reinforcing element enhances the ionic conductivity and mechanical strength of the separator. Such water soluble or water swellable polymers generally comprise about 0% to about 30%, preferably about 1% to about 10%, and more preferably about 1% to about 4% by weight, of the total monomer solution (prior to polymerization).

A polymerization initiator may also be included, such as ammonium persulfate, alkali metal persulfates and peroxides, other initiators, or combinations comprising at least one of the foregoing initiators. Such initiators may generally comprise about 0% to about 3% of the solution prior to polymerization. Further, an initiator may be used in combination with radical generating methods such as radiation, including for example, ultraviolet light, X-ray, γ-ray, and the like. However, the chemical initiators need not be added if the radiation alone is sufficiently powerful to begin the polymerization. Specific examples of suitable polymerization initiators include, but are not limited to, 1-phenyl-2-methyl-2-hydroxypropanone, ammonium persulfate, 4,4'-diazidostilbene-2,2'-disulfonic acid disodium salt, benzenediazonium 4-(phenylamino)-sulfate (1:1) polymer with formaldehyde, 2-(2-(vinyloxy)ethoxy)-ethanol. These initiators may be combined with charge-transfer compounds, such as triethanolamine, to enhance activity.

In addition, an acidity or alkalinity modifier may be included to neutralize the monomer solution. For example, when the monomer solution is acidic, an alkaline solution such as KOH may be added to neutralize the solution.

Polymerization is generally carried out at a temperature ranging from room temperature to about 130° C. In certain embodiments, polymerization is heat induced, wherein an elevated temperature, ranging from about 75° to about 100° C., is preferred. Optionally, the polymerization may be carried out using radiation in conjunction with heating. Alternatively, the polymerization may be performed using radiation alone without raising the temperature of the ingredients, depending on the strength of the radiation. Examples of radiation types useful in the polymerization reaction include, but are not limited to, ultraviolet light, gamma rays, x-rays, electron beam, or a combination thereof.

In certain embodiments, water may be used as substantially the only liquid species added to the monomer solution. The water serves to create the matrix structure, thus acting as a space holder to increase the volume of the cured polymer. Thus, the polymer matrix volume may be defined with a specific amount of water. Generally, water comprises about 50% to about 90%, on a weight basis, preferably about 60% to about 80%, and more preferably about 62% to about 75% of the polymer matrix material.

The polymer matrix membrane or material may be provided to an end user as is, or alternatively, the water can be replaced with a solution of the proper concentration of the desired ionic species. Since the initial water defines the volume of the polymer matrix material, water can be replaced with a solution of the proper concentration of the desired ionic species with minimal swelling or shrinking, depending on the replacing solution characteristics (i.e., acidity or alkalinity, and concentration). This is desirable because the strength and ionic conductivity are critically linked to the volume and tortuosity of the solution ionic phase. Significant swelling of a polymer can reduce the strength of the final material. If, however, the material does not swell enough to provide sufficient electrolyte volume, conductivity is reduced. Generally, the volume of the polymer matrix material after species replacement deviates from the volume of the polymer matrix material before species replacement by less than about 50%, preferably less than about 20%, and more preferably less than about 5%. The solution-replacement treatment may be in the form of dipping, soaking, spraying, contacting with ion-exchange resins, or other techniques known to those skilled in the art.

In one method of forming the polymeric material the monomer solution, and an optional polymerization initiator is polymerized by heating, irradiating with ultraviolet light, gamma-rays, x-rays, electron beam, or a combination thereof, wherein a polymer matrix material is produced. When the ionic species is included in the polymerized solution, the hydroxide ion (or other ions) remains in solution after the polymerization. Further, to change or add a desired solution to the polymer matrix, the desired solution may be added to the polymer matrix, for example, by soaking the polymer matrix therein.

A polymer matrix membrane formed of the polymer matrix material may comprise, in part, a support material or substrate, which is preferably a woven or nonwoven fabric, such as a polyolefin, polyvinyl alcohol, cellulose, or a polyamide, such as nylon. Alternatively, the substrate/support may be the anode, charging electrode, or cathode (not illustrated).

In another method of forming a polymer matrix membrane, the selected fabric may be soaked in the monomer solution (with or without the desired solution species), the solution-coated fabric is cooled, and a polymerization initiator is optionally added. The monomer solution may be polymerized by heating, irradiating with ultraviolet light, gamma-rays, x-rays, electron beam, or a combination thereof, wherein the polymeric material is produced. When the desired species is included in the polymerized solution, the species remains in solution after the polymerization. Further, when the polymeric material does not include the ionic species, it may be added by, for example, soaking the polymeric material in an ionic solution.

To control the thickness of the membrane, the monomer solution or monomer solution applied to a fabric may be placed in suitable molds prior to polymerization. Alternatively, the fabric coated with the monomer solution may be placed between suitable films such as glass and polyethylene teraphthalate (PET) film. The thickness of the film may be varied will be obvious to those of skill in the art based on its effectiveness in a particular application. In certain embodiments, for example for separating oxygen from air, the membrane or separator may have a thickness of about 0.1 mm to about 0.6 mm. Because the actual conducting media remains in aqueous solution within the polymer backbone, the conductivity of the membrane is comparable to that of liquid electrolytes, which at room temperature is significantly high.

The polymer matrix material may be in the form of a hydrogel material with high conductivities, particularly at room temperature. The material possesses a definite macrostructure (i.e., form or shape). Further, the material does not recombine, for example, if a portion of the polymer matrix material is cut or otherwise removed, physically recombining them is typically not accomplished by mere contact between the portions, and the portions remain distinct. This is in contrast to gelatinous materials (e.g., Carbopol® based materials), which are typically fluid and have no independent macrostructure, and recombination of several separated portions results in an indistinguishable mass of material.

Generally, the ionic conductivities are greater than about 0.1 S/cm, preferably grater than about 0.2 S/cm, and more preferably greater than about 0.4 S/cm. It is important to note that unexpectedly high ionic conductivities (up to 0.45 S/cm thus far), but not previously observed in conventional systems have been achieved using the polymer matrix membrane in the electrochemical cells described herein. This is, in part, because the electrolyte remains in solution phase within the polymer matrix. The polymer matrix membrane also prevents penetration of dendrite metal through the membrane and therefore protects the negative electrode from dendrite formation, particularly during charging of rechargeable cells. Furthermore, the polymer matrix membrane also prevents destruction of the cell by preventing diffusion of the metal oxidation product into the electrolyte solution.

EXAMPLE

Preferred embodiments of the present invention are hereinafter described in more detail by means of the following examples that are provided by way of illustration and not by way of limitation. The reactants and reagents used in the reactions described below are readily available materials. Such materials can be conveniently prepared in accordance with conventional preparatory procedures or obtained from commercial sources.

The following procedure was used to prepare a strong polymer film for use in the present invention. 3.5 grams (g) methylenebisacrylamide, 5.3 g acrylamide, 2.6 g of 1,3,5-Triacryloylhexahydro-1,3,5-triazine, 42.9 g methacrylic acid, 6.3 g poly(sodium 4-styrenesulfonate), 1.8 g 1-phenyl-2-methyl-2-hydroxypropanone, and 7.0 g triethanolamine were dissolved in 224.6 milliliters water and then 56.1 g of 50% KOH was added to the resulting solution, which was maintained at room temperature A piece of fabric was soaked in the resulting monomer solution and then sandwiched between a piece of glass and a piece of PET transparent film. This was irradiated under strong UV light for 1 minute, whereby a strong polymer film was formed. This film was then soaked in 45% KOH for 24 hours.

The resulting film is highly conductive of hydroxide ions (0.45 S/cm), making it suitable for use in an alkaline Zinc/Air cell. The conductivity was measured with a Palico Battery Separator Test System Model 9100-2 (commercially available from Palico Instrument Laboratories, Circle Pines, Minn.). Here, the membrane film is sandwiched between an air cathode and a zinc anode, separating the air and zinc, while allowing the diffusion of hydroxide ions.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An ionic conducting membrane comprising:
   a membrane having opposing surfaces and a thickness between said surfaces, said membrane including a polymerization product of
      one or more monomers selected from the group of water-soluble, ethylenically-unsaturated acids and acid derivatives, said water soluble ethylenically unsaturated acids and acid derivatives selected from the group consisting of 1-vinyl-2-pyrrolidinone, the sodium salt of vinylsulfonic acid, and combinations comprising at least one of the foregoing ethylenically unsaturated acids and derivatives; and
      a crosslinking agent,
   wherein a first solution is used for polymerizing the membrane to the thickness; and
   wherein at least a portion of said first solution is species replaced with a second solution characterized by an alkaline component.

2. The ionic conducting membrane as in claim 1, said membrane further comprising a water-soluble or water-swellable polymer.

3. The ionic conducting membrane as in claim 1, said membrane further comprising a chemical polymerization initiator.

4. The ionic conducting membrane as in claim 1, said membrane further comprising:
   a water-soluble or water-swellable polymer; and
   a chemical polymerization initiator.

5. The ionic conducting membrane as in claim 1, said membrane further comprising a neutralizing agent.

6. The ionic conducting membrane as in claim 1, further wherein the thickness of the membrane after species replacement deviates from the thickness of the membrane before species replacement by less than about 50%.

7. The ionic conducting membrane as in claim 1, further wherein the thickness of the membrane after species replacement deviates from the thickness of the membrane before species replacement by less than about 20%.

8. The ionic conducting membrane as in claim 1, wherein water comprises about 60% to about 80%, on a weight basis, of the polymer matrix material.

9. The ionic conducting membrane as in claim 1, wherein water comprises about 62% to about 75%, on a weight basis, of the polymer matrix material.

10. The ionic conducting membrane as in claim 1, wherein the ethylenically unsaturated acids or acid derivatives comprises about 5% to about 50%, by weight, of the total monomer solution prior to polymerization.

11. The ionic conducting membrane as in claim 1, wherein the ethylenically unsaturated acids or acid derivatives comprises about 7% to about 25%, by weight, of the total monomer solution prior to polymerization.

12. The ionic conducting membrane as in claim 1, wherein the ethylenically unsaturated acids or acid derivatives comprises about 10% to about 20%, by weight, of the total monomer solution prior to polymerization.

13. The ionic conducting membrane as in claim 1, wherein the crosslinking agent is of the general formula:

wherein $i = 1 \rightarrow n$, and $n \geq 2$;

$R_{2,i}$, $R_{3,i}$, and $R_{4,i}$ are independently selected from the group consisting of H, C, C2–C6 alkanes, C2–C6 alkenes, C2–C6 alkynes, aromatics, halogens, carboxylic acid derivatives, sulfates and nitrates;

$R_1$ is selected from the group consisting of N, $NR_5$, NH, O, and carboxylic-acid derivatives, wherein $R_5$ is selected from the group consisting of H, C, C2–C6 alkanes, C2–C6 alkenes, C2–C6 alkynes, and aromatics.

14. The ionic conducting membrane as in claim 1, wherein the crosslinking agent is selected from the group consisting of methylenebisacrylamide, ethylenebisacrylamide, any water-soluble N,N'-alkylidene-bis(ethylenically unsaturated amide), 1,3,5-Triacryloylhexahydro-1,3,5-triazine, and combinations comprising at least one of the foregoing crosslinking agents.

15. The ionic conducting membrane as in claim 1, wherein the crosslinking agent comprises about 0.01% to about 15%, by weight, of the total monomer solution prior to polymerization.

16. The ionic conducting membrane as in claim 1, wherein the crosslinking agent comprises about 0.5% to about 5%, by weight, of the total monomer solution prior polymerization.

17. The ionic conducting membrane as in claim 1, wherein the crosslinking agent comprises about 1% to about 3%, by weight, of the total monomer solution prior to polymerization.

18. The ionic conducting membrane as in claim 1, wherein the alkaline component comprises KOH.

19. The ionic conducting membrane as in claim 18, wherein the conductivity is greater than about 0.1 Siemens per centimeter.

20. The ionic conducting membrane as in claim 18, wherein the conductivity is greater than about 0.2 Siemens per centimeter.

21. The ionic conducting membrane as in claim 18, wherein the conductivity is greater than about 0.4 Siemens per centimeter.

22. The ionic conducting membrane as in claim 2, wherein the water-soluble or water-swellable polymer is selected from the group consisting of polysulfone (anionic), poly(sodium-4-styrenesulfonate), carboxymethyl cellulose, sodium salt of poly(styrenesulfonic acid-co-maleic acid), corn starch, any other water-soluble or water-swellable polymers, and combinations comprising at least one of the foregoing polymers.

23. The ionic conducting membrane as in claim 2, wherein the water-soluble or water-swellable polymer comprises less than about 30%, by weight, of the membrane.

24. The ionic conducting membrane as in claim 2, wherein the water-soluble or water-swellable polymer comprises about 1% to about 10%, by weight, of the membrane.

25. The ionic conducting membrane as in claim 2, wherein the water-soluble or water-swellable polymer comprises about 1% to about 4%, by weight, of the membrane.

26. The ionic conducting membrane as in claim 4, wherein the water-soluble or water-swellable polymer is selected from the group consisting of polysulfone (anionic), poly(sodium-4-styrenesulfonate), carboxymethyl cellulose, sodium salt of poly(styrenesulfonic acid-co-maleic acid), corn starch, any other water-soluble or water-swellable polymers, and combinations comprising at least one of the foregoing polymers.

27. The ionic conducting membrane as in claim 4, wherein the water-soluble or water-swellable polymer comprises less than about 30%, by weight, of the membrane.

28. The ionic conducting membrane as in claim 4, wherein the water-soluble or water-swellable polymer comprises about 1% to about 10%, by weight, of the membrane.

29. The ionic conducting membrane as in claim 4, wherein the water-soluble or water-swellable polymer comprises about 1% to about 4%, by weight, of the membrane.

30. The ionic conducting membrane as in claim 3, wherein the chemical polymerization initiator is selected from the group consisting of ammonium persulfate, alkali metal persulfates and peroxides, and combinations comprising at least one of the foregoing initiators.

31. The ionic conducting membrane as in claim 3, wherein the chemical polymerization initiator comprises less than about 3%, by weight, of the membrane 32. The ionic conducting membrane as in claim 4, wherein the chemical polymerization initiator is selected from the group consisting of ammonium persulfate, alkali metal persulfates and peroxides, and combinations comprising at least one of the foregoing initiators.

33. The ionic conducting membrane as in claim 4, wherein the chemical polymerization initiator comprises less than about 3%, by weight, of the membrane.

34. The ionic conducting membrane as in claim 1, further comprising a substrate.

35. The ionic conducting membrane as in claim 34, wherein the substrate comprises polyolefin, polyvinyl alcohol, cellulose, or polyamide.

36. The ionic conducting membrane as in claim 1, wherein said membrane is polymerized in situ on an electrode.

37. The ionic conducting membrane as in claim 1, further wherein the thickness of the membrane after species replacement deviates from the thickness of the membrane before species replacement by less than about 5%.

38. The ionic conducting membrane as in claim 1, wherein water comprises about 50% to about 90%, on a weight basis, of the membrane.

39. An ionic conducting membrane comprising:
a membrane having opposing surfaces and a thickness between said surfaces, said membrane including a polymerization product of
one or more monomers selected from the group of water-soluble, ethylenically-unsaturated acids and acid derivatives;
a water-soluble or water-swellable polymer selected from the group consisting of polysulfone (anionic), poly (sodium-4-styrenesulfonate), carboxymethyl cellulose, sodium salt of poly(styrenesulfonic acid-co-maleic acid), corn starch, any other water-soluble or water-swellable polymers, and combinations comprising at least one of the foregoing polymers; and
a crosslinking agent,
wherein a first solution is used for polymerizing the membrane to the thickness; and
wherein at least a portion of said first solution is species replaced with a second solution characterized by an alkaline component.

40. The ionic conducting membrane as in claim 39, said membrane further comprising a chemical polymerization initiator.

41. The ionic conducting membrane as in claim 39, said membrane further comprising a neutralizing agent.

42. The ionic conducting membrane as in claim 39, further wherein the thickness of the membrane after species replacement deviates from the thickness of the membrane before species replacement by less than about 50%.

43. The ionic conducting membrane as in claim 39, further wherein the thickness of the membrane after species replacement deviates from the thickness of the membrane before species replacement by less than about 20%.

44. The ionic conducting membrane as in claim 39, further wherein the thickness of the membrane after species replacement deviates from the thickness of the membrane before species replacement by less than about 5%.

45. The ionic conducting membrane as in claim 39, wherein water comprises about 50% to about 90%, on a weight basis, of the membrane.

46. The ionic conducting membrane as in claim 39, wherein water comprises about 60% to about 80%, on a weight basis, of the polymer matrix material.

47. The ionic conducting membrane as in claim 39, wherein water comprises about 62% to about 75%, on a weight basis, of the polymer matrix material.

48. The ionic conducting membrane as in claim 39, wherein the water soluble ethylenically unsaturated acids and acid derivatives have the general formula:

wherein R1, R2, and R3 are independently selected from the group consisting of H, C, C2–C6 alkanes, C2–C6 alkenes, C2–C6 alkynes, aromatics, halogens, carboxylic acid derivatives, sulfates and nitrates; and
R4 is selected from the group consisting of NR5, NHR5, NH2, OH, H, halides, OR5, and carboxylic acid derivatives, wherein R5 is selected from the group consisting of H, C, C2–C6 alkanes, C2–C6 alkenes, C2–C6 alkynes, and aromatics.

49. The ionic conducting membrane as in claim 39, wherein the water soluble ethylenically unsaturated acids and acid derivatives are selected from the group consisting of methylenebisacrylamide, acrylamide, methacrylic acid, acrylic acid, fumaramide, fumaric acid, N-isopropylacrylamide, N,N-dimethylacrylamide, 3,3-dimethylacrylic acid, maleic anhydride, and combinations comprising at least one of the foregoing ethylenically unsaturated acids and derivatives.

50. The ionic conducting membrane as in claim 39, wherein the water soluble ethylenically unsaturated acids and acid derivatives are selected from the group consisting of 1-vinyl-2-pyrrolidinone, the sodium salt of vinylsulfonic acid, and combinations comprising at least one of the foregoing ethylenically unsaturated acids and derivatives.

51. The ionic conducting membrane as in claim 39, wherein the ethylenically unsaturated acids or acid derivatives comprises about 5% to about 50%, by weight, of the total monomer solution prior to polymerization.

52. The ionic conducting membrane as in claim 39, wherein the ethylenically unsaturated acids or acid derivatives comprises about 7% to about 25%, by weight, of the total monomer solution prior to polymerization.

53. The ionic conducting membrane as in claim 39, wherein the ethylenically unsaturated acids or acid derivatives comprises about 10% to about 20%, by weight, of the total monomer solution prior to polymerization.

54. The ionic conducting membrane as in claim 39, wherein the crosslinking agent is of the general formula:

wherein i = 1 → n, and n ≥ 2;

R2,i, R3,i, and R4,i are independently selected from the group consisting of H, C, C2–C6 alkanes, C2–C6 alkenes, C2–C6 alkynes, aromatics, halogens, carboxylic acid derivatives, sulfates and nitrates;

R1 is selected from the group consisting of N, NR5, NH, O, and carboxylic-acid derivatives, wherein R5 is selected from the group consisting of H, C, C2–C6 alkanes, C2–C6 alkenes, C2–C6 alkynes, and aromatics.

55. The ionic conducting membrane as in claim 39, wherein the crosslinking agent is selected from the group consisting of methylenebisacrylamide, ethylenebisacrylamide, any water-soluble N,N'-alkylidene-bis(ethylenically unsaturated amide), 1,3,5-Triacryloylhexahydro-1,3,5-triazine, and combinations comprising at least one of the foregoing crosslinking agents.

56. The ionic conducting membrane as in claim 39, wherein the crosslinking agent comprises about 0.01% to about 15%, by weight, of the total monomer solution prior polymerization.

57. The ionic conducting membrane as in claim 39, wherein the crosslinking agent comprises about 0.5% to about 5%, by weight, of the total monomer solution prior to polymerization.

58. The ionic conducting membrane as in claim 39, wherein the crosslinking agent comprises about 1% to about 3%, by weight, of the total monomer solution prior to polymerization.

59. The ionic conducting membrane as in claim 39, wherein the alkaline component comprises KOH.

60. The ionic conducting membrane as in claim 39, wherein the conductivity is greater than about 0.1 Siemens per centimeter.

61. The ionic conducting membrane as in claim 39, wherein the conductivity is greater than about 0.2 Siemens per centimeter.

62. The ionic conducting membrane as in claim 39, wherein the conductivity is greater than about 0.4 Siemens per centimeter.

63. The ionic conducting membrane as in claim 39, wherein the water-soluble or water-swellable polymer comprises less than about 30%, by weight, of the membrane.

64. The ionic conducting membrane as in claim 39, wherein the water-soluble or water-swellable polymer comprises about 1% to about 10%, by weight, of the membrane.

65. The ionic conducting membrane as in claim 39, wherein the water-soluble or water-swellable polymer comprises about 1% to about 4%, by weight, of the membrane.

66. The ionic conducting membrane as in claim 40, wherein the chemical polymerization initiator is selected from the group consisting of ammonium persulfate, alkali metal persulfates and peroxides, and combinations comprising at least one of the foregoing initiators.

67. The ionic conducting membrane as in claim 40, wherein the chemical polymerization initiator comprises less than about 3%, by weight, of the membrane.

68. The ionic conducting membrane as in claim 39, further comprising a substrate.

69. The ionic conducting membrane as in claim 68, wherein the substrate comprises polyolefin, polyvinyl alcohol, cellulose, or polyamide.

70. The ionic conducting membrane as in claim 39, wherein said membrane is polymerized in situ on an electrode.

* * * * *